Figure 1:
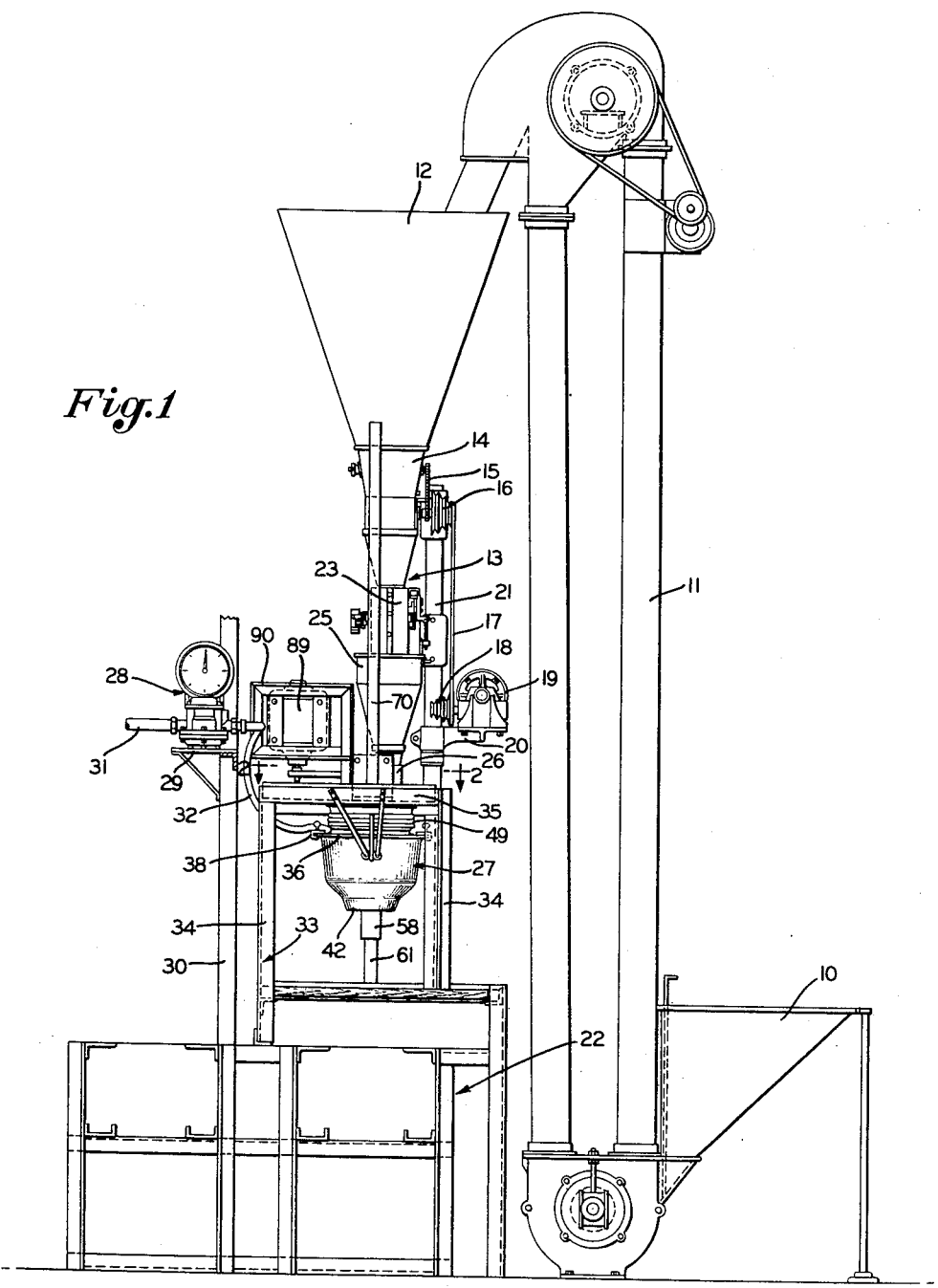

Sept. 3, 1957  R. A. MILLER  2,805,051
APPARATUS FOR MIXING GYPSUM AND THE LIKE
Filed Oct. 21, 1954  5 Sheets-Sheet 1

INVENTOR.
Richard A. Miller
BY
Frease & Bishop
ATTORNEYS

Sept. 3, 1957 R. A. MILLER 2,805,051
APPARATUS FOR MIXING GYPSUM AND THE LIKE
Filed Oct. 21, 1954 5 Sheets-Sheet 2

INVENTOR.
Richard A. Miller
BY
Frease & Bishop
ATTORNEYS

Sept. 3, 1957 R. A. MILLER 2,805,051
APPARATUS FOR MIXING GYPSUM AND THE LIKE
Filed Oct. 21, 1954 5 Sheets-Sheet 3

INVENTOR.
Richard A. Miller
BY
Frease & Bishop
ATTORNEYS

INVENTOR.
Richard A. Miller
BY Frease & Bishop
ATTORNEYS

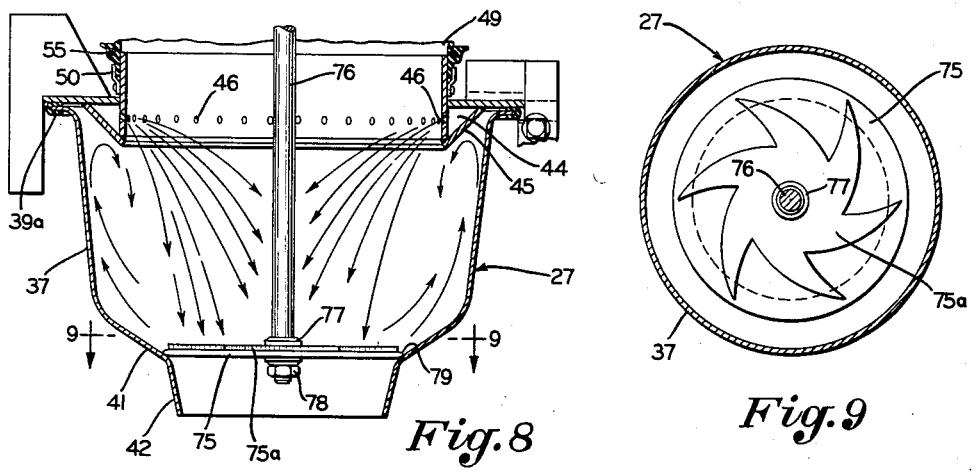
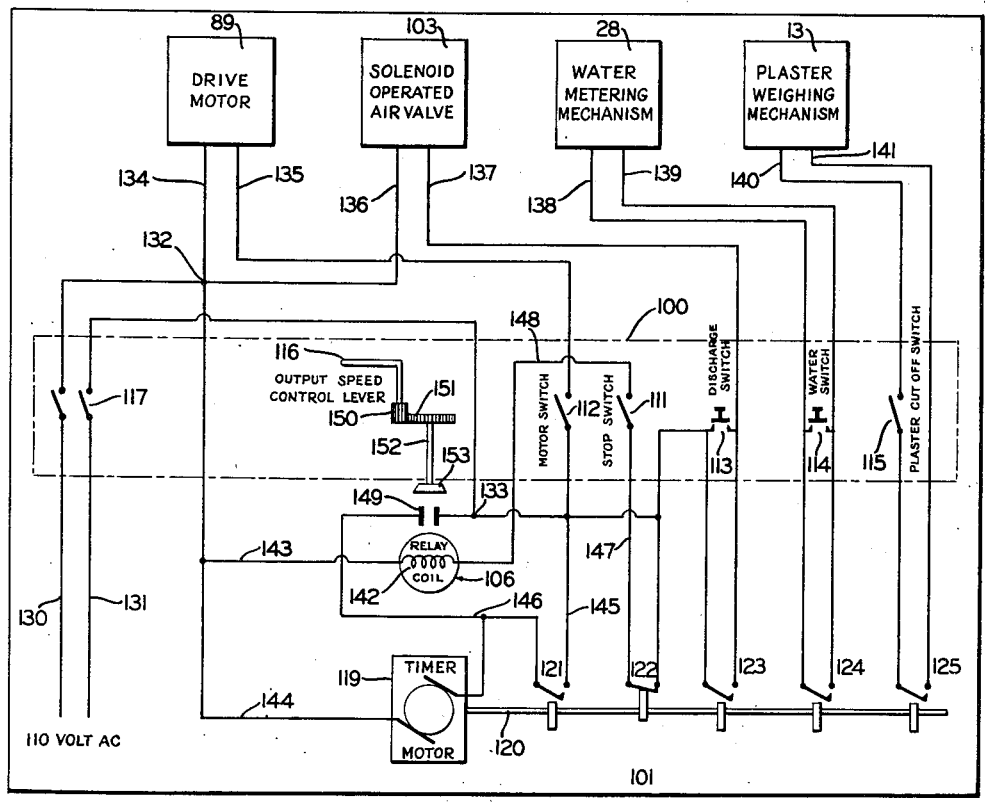

United States Patent Office 2,805,051
Patented Sept. 3, 1957

2,805,051

APPARATUS FOR MIXING GYPSUM AND THE LIKE

Richard A. Miller, New Philadelphia, Ohio

Application October 21, 1954, Serial No. 463,694

15 Claims. (Cl. 259—154)

The invention relates to apparatus for automatically mixing plaster of Paris, gypsum cements, and other compositions consisting largely of calcined gypsum, with water, and delivering the mixture in a fluid slurry, to molds, or to a bucket or other receptacle such as is ordinarily used for pouring such slurry into molds.

Plaster of Paris is manufactured from calcium sulphate dehydrate ($CaSO_4 \cdot 2H_2O$) commonly known as gypsum rock. This is accomplished by heating the gypsum rock to remove three-fourths of its water of crystallization, producing hemihydrate of calcium sulphate ($C_2SO_4 \cdot \frac{1}{2}H_2O$), commonly known as plaster of Paris.

When mixed with water, plaster of Paris rehydrates to the dehydrate ($CaSO_4 \cdot 2H_2O$) and hardens to a state similar to the original rock stage. There is no apparent action when the plaster is first added to the water, but soon afterwards a slight stiffening of the mixture takes place, and shortly afterward it "sets" to a solid, hard mass. This setting action presents the major problem in automatic and continuous mixing of plaster of Paris, as the "set" plaster will cling to the walls of the mixing vessel, mixing blades, and any other equipment with which it comes in contact, and form a solid, hard mass thereon, which clogs and otherwise obstructs the operation of the equipment. Furthermore, "set" plaster of Paris is known to act in freshly mixed plaster in such manner as to hasten the setting period of a later mix, and thereby compound the problem of clogging the mixing equipment.

It is therefore a primary object of the present invention to provide an apparatus for automatically mixing plaster of Paris, and the like, which solves the problem of clogging of the mixing equipment with a self-cleaning provision therein and which overcomes the disadvantages and difficulties inherent in such mixing equipment as has been used heretofore.

Another object is to provide such mixing apparatus which will operate for extended periods of time without the necessity of stopping to clean the mixing equipment.

A further object is to provide a mixing machine which delivers a continuing and uniform supply of mixed plaster slurry by automatically mixing a series of relatively small batches in rapid succession.

A still further object is to provide mixing apparatus which is very versatile, in that each of the various factors that determine the resulting characteristics of the mix can be pre-set.

Another object is to provide such apparatus in which the output of the machine can be varied to an appreciable degree while the machine is in operation, and without disturbing the pre-setting of the individual batches of mix in any manner.

Still another object is to provide apparatus of this type in which the pre-setting of the machine includes certain adjustments necessary to obtain the desired characteristics in the resulting mix, such as setting time, consistency of the mixture, rate of output and the range within which the output can be varied during operation of the machine, weight of plaster per batch, amount of water per batch, and length of the mixing period.

It is also an object of the invention to provide such a mixing apparatus comprising a mixing chamber into which metered amounts of water and weighed amounts of plaster of Paris are automatically delivered, a continuously rotating mixing disc normally closing the bottom of the chamber, the chamber being automatically lowered away from the mixing disc at the end of the mixing period, to discharge the mixture therefrom.

A further object is to provide a mixing apparatus of this type in which an annular water manifold is provided in the upper portion of the mixing chamber, with means for admitting metered amounts of water thereto at predetermined periods of time.

A still further object is to provide a mixing apparatus of the character referred to in which a collapsible, bellows-like extension is provided at the upper end of the mixing receptacle, to act as a dust enclosure for the mixing chamber and permit vertical movement of this chamber.

And finally, it is an object of the invention to provide such a mixing apparatus with electrical control mechanism for causing the machine to automatically operate to admit metered amounts of water and weighed amounts of plaster to the mixing chamber at predetermined times, to provide for a mixing period of predetermined time, to discharge the mix at a predetermined time, and to provide a cleaning period within predetermined time limits that are adjustable while the machine is in operation, in the above-named sequence.

The above and other objects, apparent from the drawings and following description, may be attained, the above described difficulties overcome and the advantages and results obtained, by the apparatus, construction, arrangement and combinations, sub-combinations and parts which comprise the present invention, a preferred embodiment of which, illustrative of the best mode in which applicant has contemplated applying the principle, being set forth in detail in the following description and illustrated in the accompanying drawings.

The invention may be described in general terms, as comprising a cylindrical mixing chamber having a conical lower end, a continuously rotating mixing disc normally closing the open lower end of the mixing chamber and forming the bottom wall thereof. A collapsible preferable bellows-like cylindric wall extends from the upper end of the mixing chamber to an enclosing top plate to act as a dust enclosure and at the same time permit vertical lowering of the mixing chamber away from the rotating disc, in order to discharge a mix from the mixing chamber.

An annular water manifold is provided in the upper end of the mixing chamber to admit water thereto for cleaning the chamber and also for mixing with the plaster which is admitted to the mixing chamber from a spout extended into the upper portion thereof.

Electrical control mechanism is provided for causing the apparatus to automatically operate in sequence to admit a weighed amount of plaster into the mixing chamber, which has been previously charged with a metered amount of water, to then provide a mixing period of a predetermined length of time, to then lower the mixing chamber so as to discharge the mix through the discharge port, to then raise the mixing chamber to the initial position at a predetermined time so that the rotating disc again closes the lower end of the mixing chamber, and to then admit a metered amount of water to the mixing chamber for cleaning the same and for use of the fluid ingredient of the subsequent mix.

The electrical control then provides a period for cleaning, which may be selectively varied by the operator to increase or decrease the hourly output of the machine, by means of a manual lever which permits him to change the length of the cleaning period by regulating a time delay relay in the electrical control system. The cycle is then repeated continuously.

Figure 2:
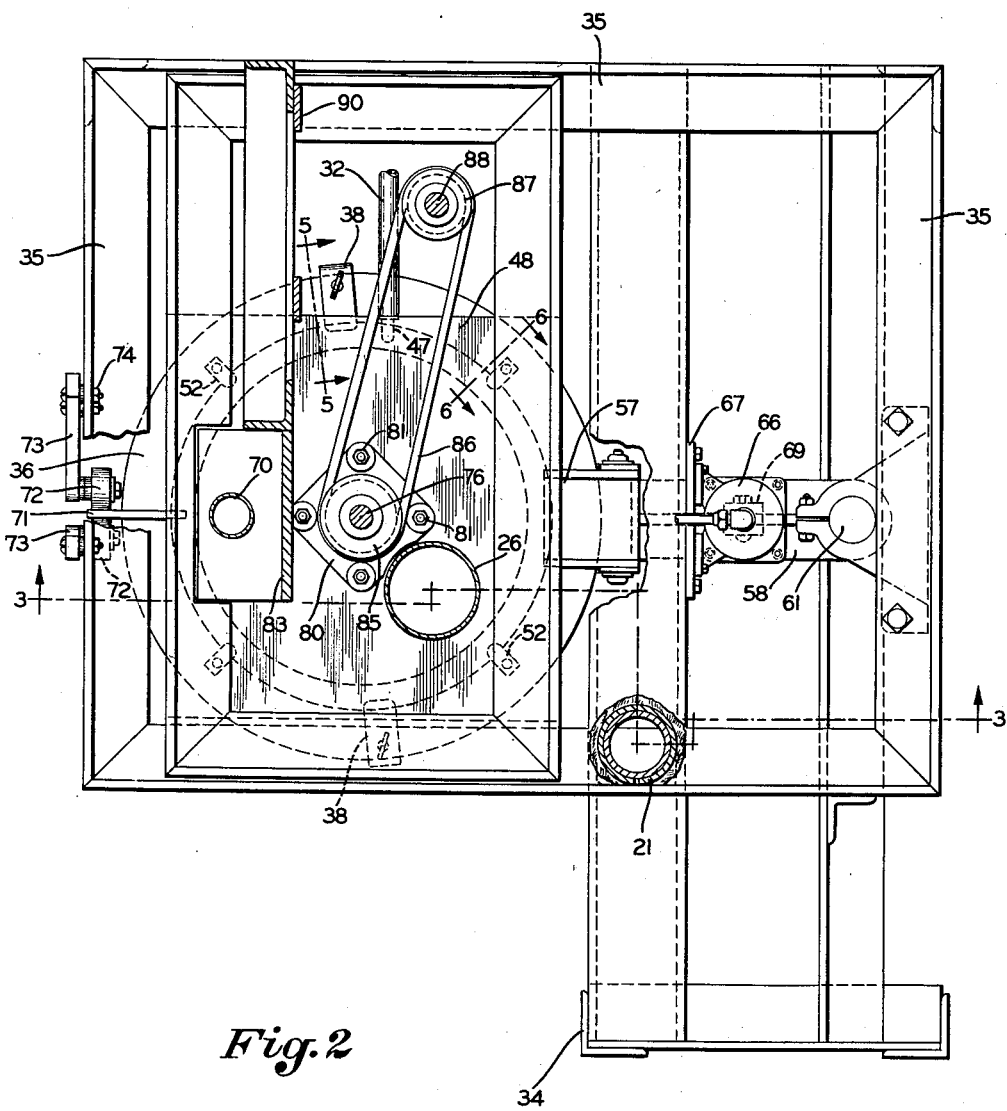
Figure 3:
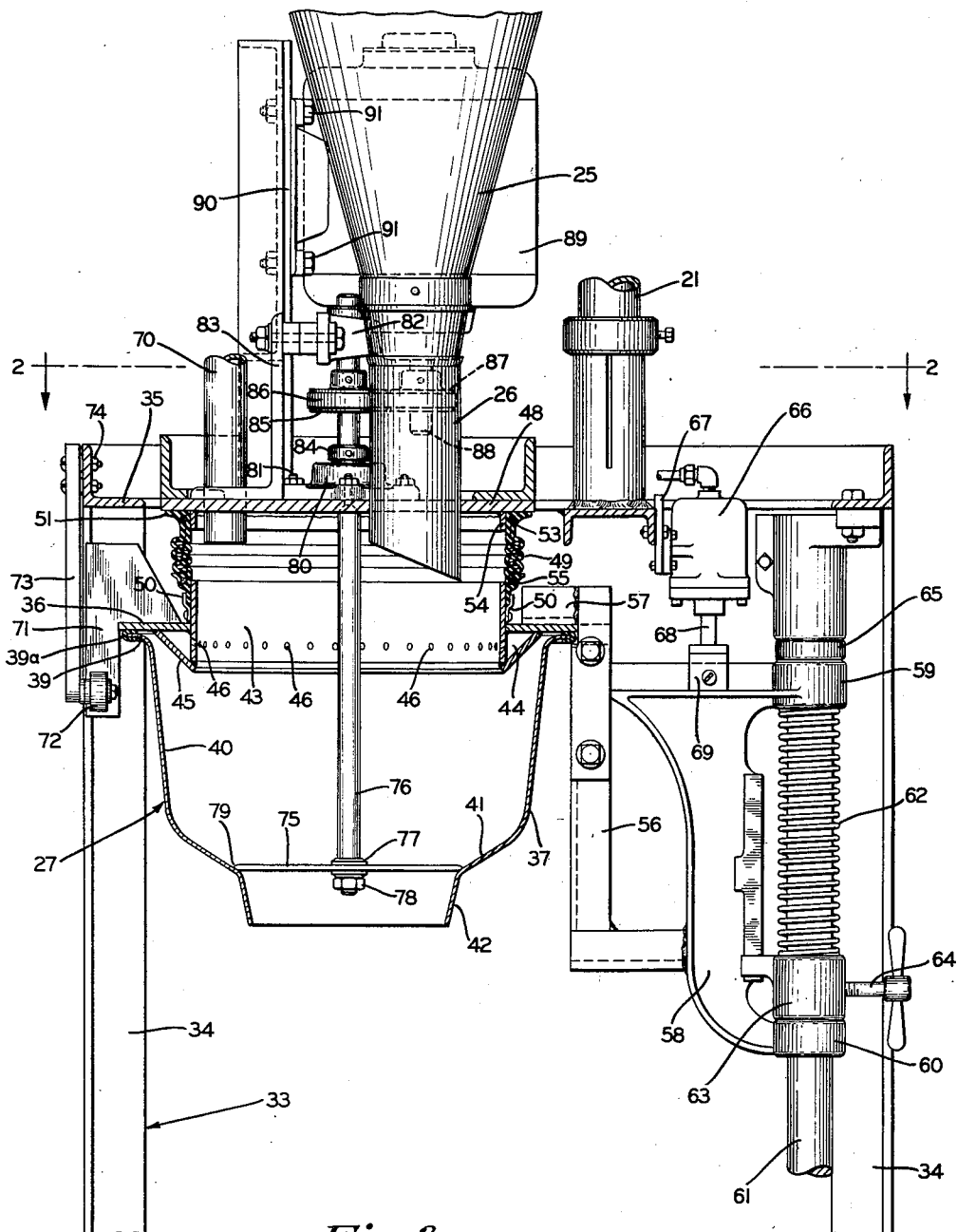
Figure 4:
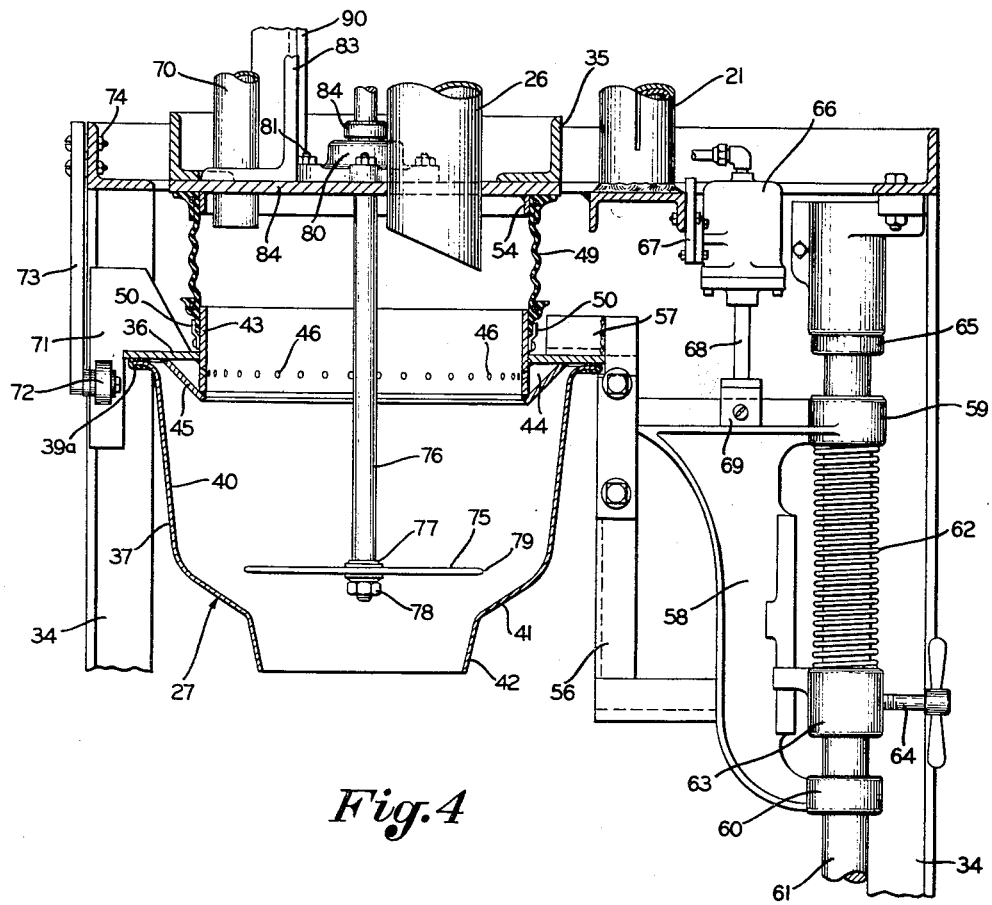
Figure 5:
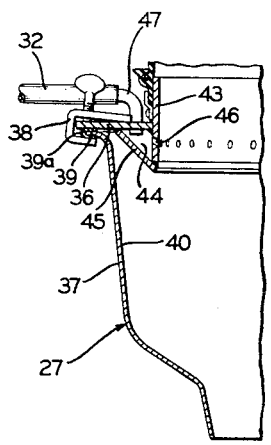
Figure 6:
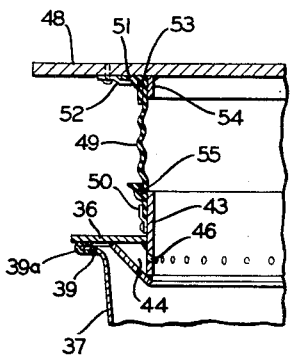

The invention thus set forth in general terms, is hereinafter described in detail, and illustrated in the accompanying drawings, forming part hereof, in which:

Fig. 1 is a side elevation of an apparatus for mixing gypsum or the like, constructed in accordance with the invention;

Fig. 2 an enlarged, plan sectional view, taken as on the line 2—2, Figs. 1 and 3;

Fig. 3 a fragmentary, vertical sectional view, taken on the line 3—3, Fig. 2, showing the vertically movable mixing chamber in the normal or raised position;

Fig. 4 a view similar to Fig. 3, showing the mixing tank in the lowered or discharging position;

Fig. 5 a fragmentary, sectional view, taken on the line 5—5, Fig. 2;

Fig. 6 a fragmentary sectional view, taken on the line 6—6, Fig. 2;

Fig. 7 a wiring diagram of the control circuit for the apparatus;

Fig. 8 a fragmentary, vertical sectional view taken from Fig. 3, showing the path of the water entering and in the mixing chamber, and also a modified form of a mixing disc; and, Fig. 9 a fragmentary, horizontal view, taken on the line 9—9, Fig. 8, showing the modified mixing disc.

Reference is now made particularly to the embodiment of the invention illustrated, in which similar numerals refer to similar parts throughout.

In Fig. 1 is shown a bin 10, from which plaster of Paris may be continuously withdrawn, as by an elevator 11, of conventional design, and charged into the supply hopper 12 of a conventional weighing apparatus indicated generally at 13.

This weighing apparatus includes the agitator hopper 14, having conventional agitator means therein (not shown) driven as by the chain drive 15, from the cone pulley 16, connected as by belt 17 to the cone pulley 18 upon the shaft of the motor 19, mounted upon bracket 20 supported upon the column 21, which extends upward from the mold conveyor frame indicated generally at 22, and supports the weighing device. The supply hopper 12 is supported by other means not shown.

The weighing apparatus or mechanism also includes the weighing hopper 23, communicating with the lower end of the feeder spout of the agitator hopper, and provided with conventional weighing mechanism (not shown) for discharging predetermined amounts of plaster of Paris into the discharge hopper 25, the discharge spout 26 of which extends into the mixing tank or chamber, best seen in Fig. 3, indicated generally at 27.

A water metering device or mechanism of any suitable conventional design, is indicated generally at 28, mounted upon a bracket 29, supported upon the upright member 30 of the frame. Water is admitted to the metering device through the supply pipe 31, connected to any suitable source of water supply, such as a usual water line, and metered amounts of water are discharged from the metering device 28, through a hose or flexible pipe 32, to the mixing chamber 27, as will be later described in detail.

All of the above parts may be of any suitable conventional and well-known design, and in themselves, other than in the combination shown, form no part of the present invention which relates particularly to the construction and operation of the mixing tank or chamber and the associated mechanism.

The mixing chamber assembly 27 is suspended for vertical movement within a frame, indicated generally at 33, comprising the upright members 34 and the horizontal members 35. For this purpose a ring plate 36 is attached to the peripheral portion of the upper, open end of the mixing chamber per se, 37, as by the C-clamps 38 engaging the out-turned peripheral flange 39 at the upper end of the mixing tank 37 and the top of the ring plate 36.

A gasket 39a is mounted on flange 39 and bears against plate 36. Preferably, as best shown in Figs. 3, 4 and 5, the mixing tank 37 has the downwardly and inwardly inclined annular wall 40, inclined sharply inward at its lower end, as indicated at 41, and terminating in the discharge port 42.

A cylindric ring 43 is welded, or otherwise secured, to the inner edge of the ring plate 36 and extends above and below said ring plate for substantially equal distances, the lower portion of the cylindric ring 43 forming the inner wall of a water manifold 44, the inner portion of the ring plate 36 forming the top wall of said manifold and the inclined splash ring plate 45 forming the outer wall thereof.

The cylindric ring 43 is provided with a plurality of apertures 46 through which water from the manifold 44 is sprayed downwardly and outwardly in a manner to be hereinafter described in detail. The water discharge hose 32 from the water metering device 28 is connected to the water manifold 44, as indicated at 47 in Fig. 5.

For the purpose of permitting vertical movement of the mixing chamber 37 relative to the horizontal top plate 48, which plate is connected to the horizontal frame members 35, and yet maintain a dust enclosure, a bellows-like flexible cylindric wall 49 is connected at its lower end to the upper end portion of the cylindric ring 43, as by the clips 50, and its upper end is provided with the out-turned, annular flange 51 attached to the top plate 48 as by clips 52.

The cylindric wall 49 may be formed of rubber or other suitable flexible material. A reinforcing ring 53, of wire or the like, is preferably located in the upper end of the flexible, accordion-like member 49, and a depending ring flange 54, attached to the top plate 48, engages the inner surface of the open, upper end of the accordion member 49. The lower end portion of the flexible member 49 may also be reinforced by a wire ring 55.

The mixing chamber assembly 27 is connected to the upper end of the vertically movable frame 56 by the channel member 57, said frame 56 being rigidly connected to the vertically movable bearing bracket 58, having the bearing members 59 and 60 at its upper and lower ends respectively, slidable upon the vertical post 61. The bracket 58 is normally held in raised position, as best shown in Fig. 3, by means of a coil spring 62, interposed between the stop collar 63, adjustably mounted upon the post 61 as by the screw 64, and the upper bearing member 59 of the bracket.

The upper stop collar 65, upon the post 61, limits upward movement of the bracket 58, as indicated in Fig. 3, and the bracket 58 is adapted to be moved downwardly, relative to the post 61, by a pneumatic or hydraulic cylinder 66 connected to the horizontal frame member 35 as by the bracket 67, the piston rod 68 of the cylinder preferably abutting the vertically movable bracket 58 as indicated at 69.

An air outlet pipe 70 is located through the top plate 48, into the upper end of the mixing chamber, to prevent an air pressure build-up in the mixing chamber. For the purpose of guiding the mixing tank assembly as it moves vertically, a guide plate 71 is attached to the ring plate 36 of the mixing tank, and a pair of guide rollers 72, journalled upon the lower ends of the brackets 73, connected to the horizontal frame 35 as at 74, contact opposite sides of said guide plates.

A rotatable mixing disc 75, of preferably rubber or other suitable material, is fixed upon the lower end of the vertical spindle 76, as by the collar 77 and nut 78, and in the normal, raised position of the mixing tank, as indicated in Fig. 3, the periphery 79 of the mixing disc is substantially in contact with the inwardly inclined lower portion 41 of the mixing chamber 37, thus forming a closure for the bottom thereof.

The vertical spindle 76 is journalled in a lower bearing 80, centrally mounted upon the top plate 48 and attached thereto as by the screws 81, and in the upper bearing 82 mounted upon a bracket 83 also attached to the top plate 48. A collar 84 is fixed upon the spindle 76 and contacts the upper side of the lower bearing 80.

The mixing disc 75 is adapted to be continuously rotated by means of a pulley 85 fixed upon the spindle and operatively connected, as by a V-belt 86, with a pulley 87 upon the shaft 88 of the motor 89. This motor is supported above the top plate 48 by means of a bracket 90 to which the motor is attached as by bolts 91.

In Fig. 7 is shown a simplified wiring diagram of the electrical control circuit which may be selectively used to control the manual operation of the mechanism or control the automatic operation of the mechanism in proper sequence. This control circuit is made up of conventional electrical devices such as a motor driven cam-operated multiple-circuit cycle timer, time delay relays, relays, switches, wiring and similar standard devices, the arrangement of which is vitally related to the operation of the machine, so as to time the automatic operating cycle of the mixer and bring the various devices into action at the proper phase of the cycle, and yet to provide the operator with manual controls which start, or stop, the machine, increase or decrease the hourly output of mixed material, discharge the contents of the mixing tank at will, charge the tank with a metered quantity of water at will, or exclude the plaster weighing device from the automatic cycle at will.

Briefly this circuit includes a control panel bounded by dotted line 100, a multi-circuit cycle timer indicated at 101, the drive motor indicated at 89, the solenoid operated air valve indicated at 103, the water metering mechanism, indicated at 28, the plaster weighing mechanism indicated at 13, and a time delay relay indicated at 106.

On the control panel bounded by dotted line 100 are mounted the stop switch 111, the drive motor switch 112, the manual discharge switch 113, the manual water switch 114, the plaster cut-off switch 115, the out-put speed control lever 116, and a double pole line switch 117.

The multi-circuit cycle timer indicated generally at 101, consists of synchronous timer motor 119 driving a cam shaft 120 with five cams that operate microswitches 121, 122, 123, 124 and 125. These are shown in Fig. 7 in a position so that the machine is at normal rest before operation is begun. A 110 volt, A. C. power line comprising the wires 130 and 131 is connected to junctions 132 and 133 respectively. The double pole switch 117 is located between the power line and these junctions.

Wire 134 is connected with the line wire 130 at junction 132 and leads directly to the drive motor indicated at 89. Wire 135 is connected with the drive motor and is connected with line wide 131 at junction 133, first going through drive motor switch 112 where wire 135 may be interrupted by switch 112 to open the circuit to the drive motor.

Wire 136 is also connected with line wire 130 at junction 132 and leads directly to the solenoid-operated air valve indicated at 103. Wire 137 is connected with the solenoid-operated air valve 103 and with both the manual discharge switch 113 and micro-switch 123 in the multi-circuit timer generally indicated at 101. Upon closing of either the manual discharge switch 113 or the micro-switch 123, wire 137 is connected with the line wire 131 through junction 133, closing the circuit to the solenoid-operated air valve 103.

The conventional water metering mechanism indicated at 28 is constructed so that it functions when a momentary contact is made between wire 138 and 139, delivering a pre-set metered quantity of water. Wires 138 and 139 are connected to manual water switch 114 and to micro-switch 124 so that when either of these switches is closed momentarily, the water metering mechanism will function.

The conventional dry powder weighing mechanism indicated at 13 is constructed so that it functions when a momentary contact is made between wire 140 and 141, delivering a predetermined weight of plaster. Wires 140 and 141 are connected to micro-switch 125 so that when micro-switch 125 closes momentarily, the weighing mechanism functions. Plaster cut-off switch 115 is located on wire 140 so that when switch 115 is in the open position, contact between wire 140 and 141 is prevented at the weighing mechanism 13 even though micro-switch 125 is closed. This permits automatic cycling of the machine without the plaster being present and is used when shutting down the machine to effect a thorough cleaning of residue from the mixing chamber.

The coil 142 of the time delay relay indicated generally at 106 is connected by wire 143 to line wire 130 through junction 132. The timer motor 119 is likewise connected to line wire 130 through junction 132 by wire 144. At the end of each cycle micro-switch 121 opens and thus breaks the connection from line wire 131 through junction 133, wire 145 and wire 146 to the timer motor 119 stopping this motor.

At the same time the micro-switch 121 opens, micro-switch 122 closes. Upon closing, micro-switch 122 makes connection between line wire 131 and coil 142 of time delay relay 106 through junction 133, micro-switch 122, wire 147, stop switch 111 and wire 148. Thus energized, the coil 142 causes the time delay relay 106 to function.

After the time delay, the relay contact points 149 close and complete the circuit from line wire 131 through junction 133, relay contact points 149 and wire 146 to the timer motor 119. The timer motor turning the cam shaft 120 causes micro-switch 121 to close, thus sustaining the circuit from line wire 131 through junction 133, wire 145, micro-switch 121 and wire 146 to the timer motor. Micro-switch 122 then opens, resetting time delay relay 106.

When in the open or stop position, the stop switch 111 breaks the circuit between wire 147 and wire 148 and thus prevents the functioning of coil 142 and the closing of time delay relay contact points 149. This permits the machine to continue to run to the cleaning phase of the cycle from any point in the cycle at which the stop switch 111 may be thrown open. The mechanism then stops cycling with water in the mixing tank to prevent solidification of any plaster thereon.

The out-put speed control lever 116 is coupled with the time delay relay indicated generally at 106 through the gears 150 and 151 and the shaft 152 to the head of the adjustment screw 153 of the time delay relay. This permits manual adjustment of the length of the cleaning period of the cycle without disturbing the fixed period of the cycle that is controlled by the multi-circuit cycle timer shown generally at 101.

With the parts in the position shown in Figs. 1 and 3, operation of the apparatus is started by pressing the manual water switch button 114, which causes a predetermined quantity of water to be metered by the metering mechanism 28, and to flow through the hose 32, the water manifold 44 and discharge into the mixing chamber 37. The motor 89, which drives the mixing disc 75, is turned on at the same time by manually closing the drive motor switch 112.

With the mixing chamber 37 charged with water and the disc 75 being rotated at a speed sufficient to effect a closure of the bottom of the mixing chamber 37 by throwing the water outward from the outer periphery of the disc 75, upward along the wall 40 of the mixing chamber 37 and dashing it against the splash rim 45, and with this rotational speed also being sufficient to thoroughly mix a pre-determined weight of plaster with a pre-determined quantity of water in a pre-determined period of time, the stop switch 111 is manually thrown into the closed position to begin automatic operation.

Closing the stop switch 111 makes connection between wire 147 and 148, and the time delay relay at 106 is caused to function. After the delay period has elapsed, the relay contact points 149 close, connecting the timer motor with line wire 131 through junction 133. This causes the timer motor 119 to turn the cam shaft and cams at 120 which close micro-switch 121 to sustain the connection of the timer motor 119 with junction 133 for the duration of the cycle.

Immediately after micro-switch 121 closes, micro-switch 122 opens to reset the time delay relay at 106. At this same time, micro-switch 125 closes momentarily and causes the plaster weighing mechanism to function and to drop a pre-set weight of plaster through discharge hopper 25, discharge spout 26 and into the mixing chamber 37. The charge of plaster drops to the spinning disc 75 and thus into a spinning vortex of water about the disc as hereinafter described.

The dropping of the plaster into the mixing chamber 37, enclosed at the bottom by the disc 75 and enclosed at the top by the flexible bellows 49 and the top plate 48, tends to cause an air pressure build-up within the described enclosure. This pressure build-up is prevented by the air outlet pipe 70 positioned through the top plate 48 and thereby the free entry of the plaster into the mixing chamber 37 through the discharge spout 26 is permitted.

With the water and plaster in the mixing chamber 37, the action of the spinning disc 75 circulates these materials about the disc to form a hollow vortex spinning with the disc and having currents within the vortex that flow outward and upward from the outer periphery of the disc against the wall 40 of the mixing chamber 37 to the splash rim 45, and thence downward along the inside wall of the vortex to again come in contact with the disc 75. These currents being nowhere well defined within the vortex result in a turbulent action which mixes the plaster with the water to form the desired mixture.

A period of time, called the mixing period, is provided for the action described and is pre-set in the multiple-circuit cycle timer 101 and the cam shaft and cams 120. The mixing period must be of sufficient length to "cream" the mix and is otherwise a major factor in determining the characteristics of the resulting mixture with a longer mixing period yielding a quicker "setting" mixture.

After the duration of the mixing period, micro-switch 123 closes and stays closed for a period of time known as the discharge period. The closing of micro-switch 123 connects line wire 131 to the solenoid-operated air valve indicated generally at 103 causing it to admit compressed air into cylinder 66 and thereby actuating this cylinder to lower the bracket frame 56—58 against the pressure of the spring 62, to the position shown in Fig. 4. This lowers the mixing chamber 37 and extends the flexible bellows-like wall 49, as shown, causing the inwardly inclined lower portion 41 of the mixing chamber 37 to be spaced from the mixing disc 75. This permits the gravitational flow of the "creamed" mixture past the disc 75 and cause the mixture to be discharged through the discharge port 42 into a pail, hose, pouring spout, molds or other receptacle suitable to receive the mixed material.

The discharge period is of sufficient length to permit all of the mixed material, except a thin film of residue, to be discharged from the mixing chamber. At the end of the discharge period, micro-switch 123 opens and disconnects line wire 131 from the solenoid-operated air valve indicated at 103, causing this valve to allow the air to be exhausted from cylinder 66. This permits spring 62 to return the mixing chamber 37 to the raised or normal position, as shown in Fig. 3, with the inwardly and downwardly inclined lower portion 41 thereof in contact with the peripheral portion 79 of the spinning mixing disc 75, thus again closing the mixing chamber.

After micro-switch 123 has opened, ending the discharge period and returning the mechanism to the position shown in Fig. 3, micro-switch 124 closes momentarily. The closing of micro-switch 124 causes the water metering mechanism 28 to function and to deliver a metered quantity of water. This water, flowing through hose 32 and through the water manifold 44, is discharged through the apertures 46 with sufficient pressure to spray downwardly and outwardly in a manner to include the greater part of the disc 75 and the lower part of spindle 76 within the area of the spray pattern as is shown in Fig. 8. No part, however, of this spray comes in contact with the bellows-like wall 49, the top plate 48, or the discharge spout 26.

The water striking spindle 76 and disc 75 is thrown outwardly by centrifugal force from the periphery 79 of the disc 75 along the inwardly inclined wall portion 41 of the mixing chamber 37. The very close proximity of the outer periphery 79 of disc 75 to the inclined lower portion 41 of the mixing chamber 37, in combination with the centrifugal force of disc 75 effects a closure of the open bottom of the mixing chamber 37 to retain the water or mixture within the mixing chamber.

After the micro-switch 124 has momentarily closed and opened, the fixed period of the cycle ends with the opening of micro-switch 121 and the closing of micro-switch 122, after which a period, known as the cleaning period, begins. The opening of micro-switch 121 breaks the circuit to the timer motor 119 causing this motor to stop. The cam shaft 120 has now made one complete revolution.

The closing of micro-switch 122 completes the circuit to the coil 142 of the time delay relay 106 causing this relay to function. After a time delay, adjustable in length by lever 116, relay 106 causes the relay contact points 149 to close the circuit to the timer motor 119, thereby beginning another automatic cycle and ending the cleaning period.

The spraying action of the water striking spindle 76 and disc 75, described above and illustrated by Fig. 8, removes the still fluid residue of the previous mix from the spindle and disc and carries the residue outwardly with the water from the periphery 79 of disc 75 and into a vortex as described above. The action of the spinning vortex removes the still fluid thin film of residue from the annular wall 40 of the mixing chamber 37 and from the splash rim 45 carrying the residue in suspension in the vortex of water. This residue is not of sufficient quantity, and is not sufficiently "set," to appreciably affect the subsequent batch to be mixed, and the water containing the residue remains in the mixing chamber to be used as the fluid ingredient of the subsequent batch.

It will also be noted that the three factors that determine the uniformity of the series of batches mixed, namely the quantity of water per batch, the weight of plaster per batch, and the length of the mixing period of each batch, are in no way changed by lengthening or shortening the cleaning period.

As an example, the subject machine may be operated with a total cycle, including the cleaning period, of as little as 30 seconds. When this 30 second cycle is extended as much as several minutes, by lengthening the cleaning period, but without changing the remaining portion of the cycle, no appreciable effect will be observed in the resulting mixture.

It will be noted, in the above example, that the addition of 15 seconds in the cleaning period of the total cycle of 30 seconds, will extend the length of the cycle so that the machine will require 33⅓% more time to produce a given volume of mixture. An addition of 30 seconds to the example cycle would likewise require 50% more time to produce a given volume. The basis of the out-put speed control, therefore, lies in changing the length of the cleaning period.

At the end of the cleaning period, relay contact points 149 close as described above, and complete the circuit to the timer motor 110, which again turns cam shaft 120 and the next cycle is begun. The cycle is then automatically repeated for an indefinite time until the operator stops the machine with the manual controls.

During automatic operation, the operator may lengthen or shorten the cleaning period of the cycle within the limits of the time delay relay 106 by moving the output speed control lever 116 which is linked through gears 150—151 and shaft 152 to the adjustment screw 153 of this time delay relay. The cleaning period may be lengthened beyond the limit of time delay relay 106 by manually opening the stop switch 111 which breaks the connection between micro-switch 122 and coil 142 and thus prevents time delay relay 106 from functioning. Stop switch 111 may be opened at any point in the cycle with the result that the apparatus will then complete that particular cycle and come to rest in the cleaning period, and stop switch 111 must then be manually closed to begin a new cycle.

After an extended period of time in operation, the operator may open plaster cut-off switch 115, which prevents operation of the plaster weighing mechanism 13, and allows the machine to run on automatic operation for one or more cycles with only clean water being discharged into the mixing chamber 37. This will thoroughly remove the residue from the lower portion of spindle 76, the upper side of collar 77, the upper side of disc 75, the annular wall 40, and the splash rim 46, and thus prepare the machine to be shut down and end operation.

Upon shutting down the machine after an extended period of operation, it will be found that the lower side of collar 77, the lower side of the disc 75 and nut 78, and the inner surface of the annular wall 40 of the discharge port 42 have a small amount of hardened residue clinging to their surfaces. At relatively infrequent intervals, this hardened residue must be manually cleaned from these surfaces as part of the normal maintenance of the mechanism. However, the centrifugal force of the disc 75 and the spinning, twisting action of the fluid mass of the mixture, passing through discharge port 42, tend to keep residue on these surfaces to a minimum so that automatic operation of the machine for relatively long periods of time is wholly practical.

It will also be found, after an extended period of operation, that the cylindric ring 43, the bellows-like cylindric wall 49, the top plate 48, the upper portion of the spindle 76, air exhaust pipe 70 and the discharge spout 26 will accumulate a coating of dust. The removal of this dust is also a part of the normal maintenance of the machine. However, the dust is not sufficient to appreciably affect the resulting mixture produced by the machine if removed upon reasonably frequent occasions as part of the normal maintenance of the machine.

Certain details in the construction of the mechanism may be varied to achieve similar but various resulting characteristics in the mixed material produced by the mechanism. The size, shape and proportions of the mixing chamber have been observed to affect the characteristics of the resulting mixture, particularly in regard to the size and spacing of the pores of the resulting "set" plaster.

An important factor, relating to the shape and proportion of the mixing chamber, is the size of the opening of discharge port 42 in relation to the diameter of the mixing chamber 37. Since the fluid mass of the mixture is held against the wall 40 of the mixing chamber 37 in the form of a hollow spinning vortex and since this centrifugal force is directed outwardly from the spinning disc 75, it is apparent that the fluid mass must lose speed and force at the beginning of the discharge period in order to flow downwardly and inwardly along the lower inclined surface 41 of the wall 40 to the discharge port 42.

Thus, the greater the difference in the relative diameters of the mixing chamber 37 and of the discharge port 42, the more slowing of action will be necessary in the spinning of the fluid mass to permit its flow through the discharge port 42, and the less twisting and spinning action of the fluid mass will be exerted on the wall 40 of the discharge port 42 below the point 41. It has been observed that a lesser action of the fluid mass, as just referred to, will tend to permit a more rapid accumulation of hardened residue on the wall 40 of the discharge port 42 than a greater action of similar nature will permit.

The consistency, or proportion of water to plaster of Paris, is regulated by presetting of the respective mechanisms 28 and 13 which meter and weigh the respective materials. The size of the individual batch, and to some degree the limits within which the hourly out-put can be varied, are also pre-set by the same mechanisms.

Establishing the desired "setting" time, or time required for the fluid slurry to be transformed into a solid mass, is also accomplished to a large degree by varying the details of construction. This setting time can be shortened by a longer mixing period, faster rotating speed of the disc 75, or modification of the disc to produce a more turbulent mixing action. A typical modification of the disc 75 to produce a more turbulent mixing action is shown in Figs. 8 and 9 where a second disc or impeller 75a is placed above disc 75, the two being held by collar 77 and nut 78.

The vanes of impeller 75a create greater friction between the disc and the fluid mass being mixed as compared to the plain disc 75. Similar results are also obtained by molding the vane pattern in relief as an integral part of the mixing disc. This is an important modification, for it permits shortening of the mixing period for a given resulting "setting" time and therefore appreciably increases the hourly out-put of the mixer.

It should be noted that the addition of one or more circuits to the multiple cycle timer 101, one or more liquid manifolds as at 44, one or more discharge spouts as at 26, one or more metering mechanisms as at 28 and one or more weighing mechanisms as at 13, and the similar connection of these additional parts to function as shown in the description and illustrations of the machine, will permit the addition of one or more liquid or solid ingredients to the resulting mixture as may be desired and at any point in the mixing cycle as may be desired. Such additions of ingredients are frequently made to plaster of Paris or the like to serve to accelerate the "setting time," retard the "setting time" and strengthen or harden the resulting mixture.

From the above, it will be apparent that a novel and efficient machine is provided for automatically mixing plaster of Paris, gypsum cements, or compositions consisting of a greater part of calcined gypsum, with water, and delivering the mixture, at the desired point, in a fluid slurry. It will also be obvious that the machine will operate for extended periods of time without the necessity of stopping to clean the mixing equipment.

Further, it is evident that the machine delivers a continuing and uniform supply of properly mixed and "creamed" plaster slurry, by automatically mixing and delivering a series of relatively small batches in rapid succession.

Also, it will be seen from the above, that the machine is very versatile, in that each of the several factors that determine the resulting characteristics of the mix can be pre-set for any desired predetermined timing, proportions of material and consistency of mixture. And also, it is obvious that the operator can vary the output of the machine to an appreciable degree, while it is in operation, without disturbing the pre-setting of the individual batches in any way. Finally, it is apparent that the novel construction and operation of the mixing chamber and spinning mixing disc forms an important part of the invention.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. Apparatus for mixing rapidly solidifying material such as gypsum cement, comprising a vertically movable mixing tank having an open lower end of reduced diameter, a rotatable mixing disc having a running fit in the reduced portion of the tank normally closing said open lower end of the tank, means for admitting water to the tank, means for admitting gypsum to the tank, means for continuously rotating the disc to thoroughly mix the water and gypsum by centrifugal action, means for normally holding the tank in raised position during the mixing period, and means for lowering the tank relative to the rotating disc to discharge the mix at the end of the mixing period.

2. Apparatus for mixing rapidly solidifying material such as gypsum cement, comprising a vertically movable mixing tank having an open lower end of reduced diameter, a rotatable mixing disc having a running fit in the reduced portion of the tank normally closing said open lower end of the tank, means for admitting a measured amount of water to the tank, means for admitting a measured amount of gypsum to the tank, means for continuously rotating the disc to thoroughly mix the water and gypsum by centrifugal action, means for normally holding the tank in raised position during the mixing period, means for lowering the tank relative to the rotating disc to discharge the mix at the end of the mixing period, means for raising the tank to normal position, and means for admitting another measured amount of water to clean the tank and disc immediately after the tank is raised to normal position.

3. Apparatus for mixing rapidly solidifying material such as gypsum cement, comprising a vertically movable mixing tank having an open lower end of reduced diameter, a rotatable mixing disc having a running fit in the reduced portion of the tank normally closing said open lower end of the tank, an annular manifold in the upper portion of the tank for admitting water to the tank, means for admitting gypsum to the tank, means for continuously rotating the disc to thoroughly mix the water and gypsum by centrifugal action, means for normally holding the tank in raised position during the mixing period, and means for lowering the tank relative to the rotating disc to discharge the mix at the end of the mixing period.

4. Apparatus for mixing rapidly solidifying material such as gypsum cement, comprising a vertically movable mixing tank having an open lower end of reduced diameter, a flexible extension of bellows-like form at the upper end of the tank, a rotatable mixing disc having a running fit in the reduced portion of the tank normally closing said open lower end of the tank, means for admitting water to the tank, means for admitting gypsum to the tank, means for continuously rotating the disc to thoroughly mix the water and gypsum by centrifugal action, means for normally holding the tank in raised position during the mixing period, and means for lowering the tank relative to the rotating disc to discharge the mix at the end of the mixing period.

5. Apparatus for mixing rapidly solidifying material such as gypsum cement, comprising a vertically movable mixing tank having an open lower end of reduced diameter, a rotatable mixing disc having a running fit in the reduced portion of the tank normally closing said open lower end of the tank, means for admitting water to the tank, means for admitting gypsum to the tank, means for continuously rotating the disc to thoroughly mix the water and gypsum by centrifugal action, spring means for normally holding the tank in raised position during the mixing period, and a cylinder for lowering the tank relative to the rotating disc to discharge the mix at the end of the mixing period.

6. Apparatus for mixing rapidly solidifying material such as gypsum cement, comprising a vertically movable mixing tank having an open lower end of reduced diameter, a flexible extension of bellows-like form at the upper end of the tank, a rotatable mixing disc having a running fit in the reduced portion of the tank normally closing said open lower end of the tank, means for admitting water to the tank, means for admitting gypsum to the tank, means for continuously rotating the disc to thoroughly mix the water and gypsum by centrifugal action, spring means for normally holding the tank in raised position during the mixing period, and a cylinder for lowering the tank relative to the rotating disc to discharge the mix at the end of the mixing period.

7. Apparatus for mixing rapidly solidifying material such as gypsum cement, comprising a vertically movable mixing tank having an open lower end of reduced diameter, a flexible extension of bellows-like form at the upper end of the tank, a rotatable mixing disc having a running fit in the reduced portion of the tank normally closing said open lower end of the tank, an annular manifold in the upper portion of the tank for admitting water to the tank, means for admitting gypsum to the tank, means for continuously rotating the disc to thoroughly mix the water and gypsum by centrifugal action, spring means for normally holding the tank in raised position during the mixing period, and a cylinder for lowering the tank relative to the rotating disc to discharge the mix at the end of the mixing period.

8. Apparatus for mixing rapidly solidifying material such as gypsum cement, comprising a vertically movable mixing tank having an open lower end of reduced diameter, a flexible extension of bellows-like form at the upper end of the tank, a rotatable mixing disc having a running fit in the reduced portion of the tank normally closing said open lower end of the tank, an annular manifold upon the inner walls of the tank at the upper end thereof for admitting water to the tank, means for admitting gypsum to the tank, means for continuously rotating the disc to thoroughly mix the water and gypsum by centrifugal action, means for normally holding the tank in raised position during the mixing period, and means for lowering the tank relative to the rotating disc to discharge the mix at the end of the mixing period.

9. Apparatus for mixing rapidly solidifying material such as gypsum cement, comprising a horizontal support, a flexible hollow cylinder of bellows-like form suspended from said support, a mixing tank suspended from said flexible hollow cylinder and having an open lower end of reduced diameter, a vertical shaft journalled in said support, said shaft extending into said tank, a mixing disc fixed upon the lower end of the shaft having a running fit in the reduced portion of the tank normally closing the lower end of the tank, means for admitting water to the tank, means for admitting gypsum to the tank, means for continuously rotating the shaft to thoroughly mix the water and gypsum by centrifugal action, means for normally holding the tank in raised position during the mixing period, and means for lowering the tank relative to the rotating disc to discharge the mix at the end of the mixing period.

10. Apparatus for mixing rapidly solidifying material such as gypsum cement, comprising a horizontal support, a flexible hollow cylinder of bellows-like form suspended from said support, a mixing tank suspended from said flexible hollow cylinder and having an open lower end of reduced diameter, a vertical shaft journalled in said support, said shaft extending into said tank, a mixing disc fixed upon the lower end of the shaft having a running fit in the reduced portion of the tank normally closing the lower end of the tank, means for admitting water to the tank, means for admitting gypsum to the tank, means for continuously rotating the shaft to thoroughly mix the water and gypsum by centrifugal action, a bracket attached to one side of the tank, a vertical post upon which the bracket is slidably mounted, a coil spring surrounding said vertical post for normally holding the tank in raised position during the mixing period, and cylinder means operatively connected to said bracket for lowering the tank relative to said rotating disc to discharge the mix at the end of the mixing period.

11. Apparatus for mixing rapidly solidifying material such as gypsum cement, comprising a horizontal support, a flexible hollow cylinder of bellows-like form suspended from said support, a mixing tank suspended from said flexible hollow cylinder and having an open lower end of reduced diameter, a vertical shaft journalled in said support, said shaft extending into said tank, a mixing disc fixed upon the lower end of the shaft having a running fit in the reduced portion of the tank normally closing the lower end of the tank, a metering device for admitting predetermined amounts of water to the tank, a gypsum hopper above the tank, a weighing device for admitting predetermined amounts of gypsum from said hopper to the tank, means for continuously rotating the shaft to thoroughly mix the water and gypsum by centrifugal action, means for normally holding the tank in raised position during the mixing period, means for lowering the tank relative to the rotating disc to discharge the mix at the end of the mixing period, an electric circuit, and means in said circuit for operating the water metering device, the gypsum weighing device and the tank lowering device in sequence.

12. Apparatus for mixing rapidly solidifying material such as gypsum cement, comprising a horizontal support, a flexible hollow cylinder of bellows-like form suspended from said support, a mixing tank suspended from said flexible hollow cylinder and having an open lower end of reduced diameter, a vertical shaft journalled in said support, said shaft extending into said tank, a mixing disc fixed upon the lower end of the shaft having a running fit in the reduced portion of the tank normally closing the lower end of the tank, a metering device for admitting predetermined amounts of water to the tank, a gypsum hopper above the tank, a weighing device for admitting predetermined amounts of gypsum from said hopper to the tank, means for continuously rotating the shaft to thoroughly mix the water and gypsum by centrifugal action, spring means for normally holding the tank in raised position during the mixing period, a cylinder for lowering the tank relative to the rotating disc to discharge the mix at the end of the mixing period, an electric circuit, and means in said circuit for operating the water metering device, the gypsum weighing device and the tank lowering cylinder in sequence.

13. Apparatus for mixing rapidly solidifying material such as gypsum cement, comprising a horizontal support, a flexible hollow cylinder of bellows-like form suspended from said support, a mixing tank suspended from said flexible hollow cylinder and having an open lower end of reduced diameter, a vertical shaft journalled in said support, said shaft extending into said tank, a mixing disc fixed upon the lower end of the shaft having a running fit in the reduced portion of the tank normally closing the lower end of the tank, a metering device for admitting predetermined amounts of water to the tank, a gypsum hopper above the tank, a weighing device for admitting predetermined amounts of gypsum from said hopper to the tank, means for continuously rotating the shaft to thoroughly mix the water and gypsum by centrifugal action, means for normally holding the tank in raised position during the mixing period, means for lowering the tank relative to the rotating disc to discharge the mix at the end of the mixing period, an electric circuit, and means in said circuit for operating the water metering device, the gypsum weighing device and the tank lowering device at predetermined intervals in sequence.

14. Apparatus for mixing rapidly solidifying material such as gypsum cement, comprising a horizontal support, a flexible hollow cylinder of bellows-like form suspended from said support, a mixing tank suspended from said flexible hollow cylinder and having an open lower end of reduced diameter, a vertical shaft journalled in said support, said shaft extending into said tank, a mixing disc fixed upon the lower end of the shaft having a running fit in the reduced portion of the tank normally closing the lower end of the tank, means for admitting water to the tank, means for admitting gypsum to the tank, means for continuously rotating the shaft to thoroughly mix the water and gypsum by centrifugal action, means for normally holding the tank in raised position during the mixing period, means for lowering the tank relative to the rotating disc to discharge the mix at the end of the mixing period, an electric circuit, and means in said circuit for operating the water admitting means, the gypsum admitting means and the tank lowering means at predetermined intervals in sequence.

15. Apparatus for mixing rapidly solidifying material such as gypsum cement, comprising a vertically movable mixing tank having an open lower end of reduced diameter, a rotatable mixing disc having a running fit in the reduced portion of the tank normally closing said open lower end of the tank, means for admitting water to the tank, means for admitting gypsum to the tank, means for continuously rotating the disc to thoroughly mix the water and gypsum by centrifugal action, means for normally holding the tank in raised position during the mixing period, means for lowering the tank relative to the rotating disc to discharge the mix at the end of the mixing period, an electric circuit, and means in said circuit for operating the water admitting means, the gypsum admitting means and the tank lowering means at predetermined intervals in sequence.

References Cited in the file of this patent

UNITED STATES PATENTS

| 681,197 | Cooper | Aug. 27, 1901 |
| 1,101,199 | Legg et al. | June 23, 1914 |
| 1,897,490 | Noble et al. | Feb. 14, 1933 |
| 2,564,852 | Mason et al. | Aug. 21, 1951 |

FOREIGN PATENTS

| 2,947 | Great Britain | Feb. 6, 1909 |
| 970,139 | France | Dec. 29, 1950 |